United States Patent
Ayyagari et al.

(10) Patent No.: US 11,412,067 B2
(45) Date of Patent: Aug. 9, 2022

(54) METHOD, SYSTEM AND APPARATUS FOR DYNAMIC STAGING OF CLIENT COMPUTING DEVICES

(71) Applicant: SYMBOL TECHNOLOGIES, LLC, Lincolnshire, IL (US)

(72) Inventors: Deepak Ayyagari, Bangalore (IN); Allan Perry Herrod, Mission Viejo, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 43 days.

(21) Appl. No.: 15/835,669

(22) Filed: Dec. 8, 2017

(65) Prior Publication Data

US 2019/0182353 A1 Jun. 13, 2019

(51) Int. Cl.
| | |
|---|---|
| *H04L 67/00* | (2022.01) |
| *G06F 9/445* | (2018.01) |
| *H04L 67/06* | (2022.01) |
| *H04W 4/80* | (2018.01) |
| *G06K 19/06* | (2006.01) |
| *G06F 8/65* | (2018.01) |

(52) U.S. Cl.
CPC .......... *H04L 67/34* (2013.01); *G06F 9/44505* (2013.01); *H04L 67/06* (2013.01); *H04W 4/80* (2018.02); *G06F 8/65* (2013.01); *G06K 19/06028* (2013.01)

(58) Field of Classification Search
CPC ..... H04L 67/34; H04L 67/06; G06F 9/44505; G06F 8/65; H04W 4/80; G06K 19/06028; G06K 19/06037; G06K 19/06112; G06K 19/06131; G06K 19/0614; G06K 19/615; G06K 19/06159; G06K 19/06168
See application file for complete search history.

(56) References Cited

U.S. PATENT DOCUMENTS

| | | | |
|---|---|---|---|
| 7,062,455 B1 | 6/2006 | Tobey | |
| 8,746,548 B2 * | 6/2014 | Terwilliger | .......... G06K 7/1095 235/375 |
| 9,292,739 B1 | 3/2016 | Gray et al. | |
| 9,875,456 B2 | 1/2018 | Favier | |
| 2005/0005760 A1 * | 1/2005 | Hull | .......... G10H 1/00 84/645 |
| 2006/0000910 A1 | 1/2006 | Chong et al. | |
| 2007/0027964 A1 | 2/2007 | Herrod et al. | |

(Continued)

OTHER PUBLICATIONS

Motorola Solutions, MSP Client Software Guide (Aug. 2012).

(Continued)

*Primary Examiner* — Patrice L Winder
*Assistant Examiner* — Aye M Aung

(57) ABSTRACT

A method of dynamic staging in a client device includes: receiving, at the client device, a staging profile identifier definition; generating a staging profile identifier corresponding to one of a plurality of staging data files stored at a server, by: detecting a dynamic field in the staging profile identifier definition; retrieving a local parameter from a memory of the client device according to the dynamic field; and replacing the dynamic field with the local parameter to generate the staging profile identifier; and retrieving the one of the plurality of staging data files by transmitting a request to the server including the staging profile identifier.

20 Claims, 5 Drawing Sheets

(56) References Cited

U.S. PATENT DOCUMENTS

| | | | |
|---|---|---|---|
| 2010/0234050 A1 | 9/2010 | Herrod | |
| 2010/0258630 A1* | 10/2010 | Shenfield | G06Q 30/00 235/462.15 |
| 2012/0149343 A1 | 6/2012 | Sanka et al. | |
| 2012/0151022 A1 | 6/2012 | Ayyagari et al. | |
| 2013/0024326 A1* | 1/2013 | Dearing | G06Q 50/184 382/101 |
| 2013/0037608 A1* | 2/2013 | Evevsky | G06F 21/31 235/380 |
| 2013/0071029 A1 | 3/2013 | Terwillinger et al. | |
| 2013/0173484 A1* | 7/2013 | Wesby | G06K 7/1413 705/318 |
| 2014/0104139 A1* | 4/2014 | Buchner | G06F 3/1438 345/1.3 |
| 2014/0298293 A1* | 10/2014 | Nishio | G06F 8/30 717/121 |
| 2015/0041530 A1* | 2/2015 | Burkhart | G06K 7/1404 235/375 |
| 2015/0248498 A1* | 9/2015 | Han | G06F 16/9554 235/375 |
| 2015/0339414 A1* | 11/2015 | Kuo | G06F 30/367 716/103 |
| 2016/0029155 A1* | 1/2016 | Kerr | H04W 4/029 455/456.3 |
| 2016/0065654 A1* | 3/2016 | Cai | G06F 9/44505 726/4 |
| 2016/0188886 A1 | 6/2016 | Weiss et al. | |
| 2016/0283699 A1* | 9/2016 | Levin | H04W 12/08 |
| 2018/0322536 A1* | 11/2018 | Zhang | G06Q 30/0277 |
| 2020/0153687 A1 | 5/2020 | Ayyagari et al. | |

OTHER PUBLICATIONS

Motorola Inc., Mobility Services Platform 3.2 User's Guide (Jun. 2008).

Zebra, StageNow Android Device Staging (Retrieved on Nov. 30, 2017 from https://www.zebra.com/us/en/products/software/mobile-computers/mobile-app-utilities/stagenow.html).

Zebra, StageNow 2.8 (Retrieved on Nov. 25, 2019 from https://techdocs.zebra.com/stagenow/2-8/about/stageNow 2.8-Zebra Technologies TechDocs).

Zebra, StageNow "Specification Sheet" Copyright (Jun. 2015).

Zebra Programming Guide: SGD Printer Commands, published Jan. 31, 2018.

\* cited by examiner

METHOD, SYSTEM AND APPARATUS FOR DYNAMIC STAGING OF CLIENT COMPUTING DEVICES

BACKGROUND

Various operating environments, such as warehouses and the like, employ sets of client computing devices, such as mobile barcode scanners, label printers and the like. Prior to deployment within the operating environment, such devices typically require configuration, also referred to as staging. For example, staging may include the installation of software particular to the operating environment. The specific configuration information for different devices in the set may not be identical, however.

One staging modality is barcode staging, which takes advantage of the barcode scanning capability. Barcode staging delivers staging information to the device by encoding it in a barcode that is read by the staging client at the device. Since the amount of data that can be effectively stored in a barcode is limited, efficient staging using barcodes typically stores a minimum of configuration information for a given device configuration type in the barcode and acquires additional configuration information over a network that is accessed based on the staging information extracted from the barcode. NFC tag staging is another alternative staging modality that provides similar capabilities and has similar data size limitations.

Another staging modality is audio staging, wherein a device uses its built-in microphone to listen to audio generated by a source (typically a PC) which encodes the staging information as audio sequences that are played through speakers. This modality leverages the fact that many mobile devices are equipped with built-in microphones that are used for telephony and other voice-related applications. To increase the reliability of audio staging in a potentially noisy environment, and to avoid sounds which could be annoying to humans in the vicinity of the device being staged, the encoding of the staging information uses a limited number of audio frequencies that change on a slow cadence. This means that audio staging also has data size limitations since large staging profiles would need to be encoded into long audio sequences, thereby drastically increasing each staging session duration.

Accommodating variations in configuration information across the set of client devices that require different configurations can also lead to lengthy manual configuration processes. This requires an operator to scan a different configuration barcode with each device that needs to be differently configured. Scanning a different barcode or tapping a different NFC tag, for each device model or configuration type for example, is complicated and error-prone. Similarly, with respect to audio staging, playing multiple different audio configuration files at the same time is likely to present many challenges, such as audio signal interference.

In some implementations, attempts to reduce the need for manual scanning of large numbers of barcodes, NFC tags and the like include deploying a host staging device such as a workstation. Rather than scanning barcodes or the like, each client device is configured to discover the host staging device and send a request to the host containing a device identifier. The host staging device executes host software to look up, based on the identifier, which configuration information to provide to the client device. The host device itself, however, introduces additional complexity and processing delay to the staging system as the host device must be provisioned with look-up data and the above-mentioned host software, in addition to the configuration information. Further, in such implementations network connections for the client devices (permitting the client devices to discover the host device) must be configured before staging can begin, and the host device must be present on the same network as the client devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
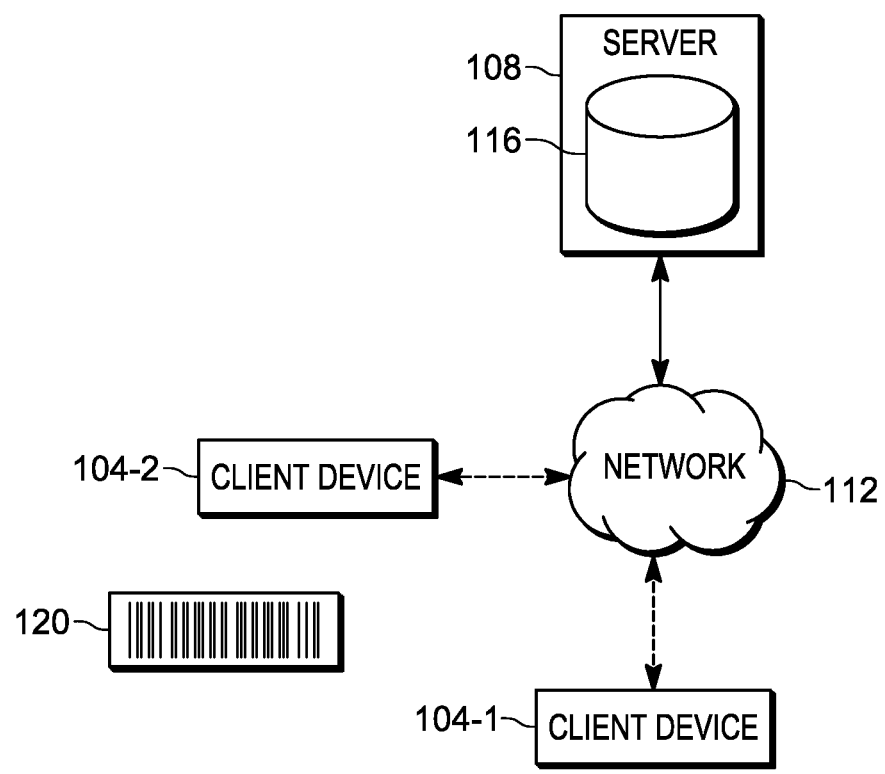
FIG. 1 is a schematic diagram of a system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamic staging in a client device, comprising: receiving, at the client device, a staging profile identifier definition; generating a staging profile identifier corresponding to one of a plurality of staging data files stored at a server, by: detecting a dynamic field in the staging profile identifier definition; retrieving a local parameter from a memory of the client device according to the dynamic field; and replacing the dynamic field with the local parameter to generate the staging profile identifier; and retrieving the one of the plurality of staging data files by transmitting a request to the server including the staging profile identifier.

Additional examples disclosed herein are directed to a client computing device, comprising: a communications interface; a memory storing a local parameter; and a processor interconnected with the communications interface and the memory, the processor configured to: receive a staging profile identifier definition; generate a staging profile identifier corresponding to one of a plurality of staging data files stored at a server, by: detect a dynamic field in the staging profile identifier definition; retrieve a local parameter from a memory of the client device according to the dynamic field; and replace the dynamic field with the local parameter to generate the staging profile identifier; and retrieve the one of the plurality of staging data files by transmitting a request to the server including the staging profile identifier.

Further examples disclosed herein are directed to a method of dynamic staging in a server, comprising: storing a plurality of staging data files in a memory, each staging data file containing client device configuration data; receiving, from a client device, a request for configuration data, the request including a staging profile identifier; wherein the staging profile identifier includes a local parameter inserted by the client device into a staging profile identifier definition to replace a dynamic field of the staging profile identifier definition and thereby generate the staging profile identifier; response to receiving the request, retrieving one of the staging data files from the memory that corresponds to the staging profile identifier; and transmitting the retrieved staging data file to the client device.

FIG. 1 depicts a system 100 including a plurality of client computing devices, of which two examples 104-1 and 104-2 (collectively referred to as the wireless client computing devices 104, and generically referred to as a wireless client computing device 104) are shown. The client computing devices 104 are also referred to herein simply as client devices 104. The client devices 104 may be barcode scanners, smartphones, tablet computers, label printers, or the like. A plurality of client devices 104 may be deployed in a facility or other operating environment, such as a warehouse, supermarket, or the like, where the client devices 104 perform a variety of functions. Such functions may include any one or more of printing labels, scanning barcodes, capturing images, receiving and displaying instructions (e.g. pick instructions in a warehouse) for an operator, and the like.

The client devices 104, in order to perform the above functions, typically require configuration prior to being deployed in the operating environment. The configuration can include any one or more of loading software applications onto the devices 104, providing network connectivity (e.g. by providing the devices 104 with credentials for connecting to a network that is deployed within the operating environment), and the like. Such pre-deployment configuration of the devices 104 is also referred to as staging the devices 104.

In some deployments of a set of devices 104, a plurality of functions may be performed within the operating environment, with one function being assigned to a first device type (e.g. a label printer) and another function being assigned to a second device type (e.g. a barcode scanner). Different devices types may therefore be staged differently (i.e. be provided with different configuration data). Further, in some implementations devices with differing attributes, such as different hardware models, operating system versions and the like, may be designated to perform the same functions within the operating environment. Although the devices are intended to perform the same functions, their different attributes may require different configuration data to be provided to each device 104. For example, a different version of a barcode scanning application may be provided to each device, depending on the operating system version of that device.

As will be discussed in greater detail below, the system 100 is implemented so as to permit the devices 104 to perform certain actions for retrieving staging data from a server 108 via a network 112. The network 112 may, for example, be a wireless local area network (WLAN) based on a suitable member of the IEEE 802.11 family of communication standards (i.e. a WiFi network). In other examples, however, the network 112 can be a wired network or a combination of wired and wireless networks. Further, the network 112 can include a wide-area network (WAN) such as the Internet.

The server 108 is configured to store a plurality of staging data files in a repository 116. The server 108, as will be seen below, is configured to provide a particular staging data file to a device 104 over the network 112 responsive to receiving a request from the device 104 that includes a staging profile identifier corresponding to the staging data file.

To generate and transmit the above-mentioned request to the server 116, each device 104 is configured to receive the staging profile identifier. As will be discussed below, the devices 104-1 and 104-2 are configured to generate different staging profile identifiers—used to retrieve different staging data files from the server 108—from a single staging profile identifier definition that contains one or more dynamic fields. The staging profile identifier definition may be received at each device 104 in a variety of manners. In the example shown in FIG. 1, the staging profile identifier definition is encoded in an indicium 120, such as a barcode (as depicted) or an NFC tag, or in an audio staging file, that each device 104 is configured to capture and process.

More generally, the system 100 permits the provision of a number of different staging data files to a plurality of devices 104 via deployment of a smaller number of staging profile identifier definitions (including, in some embodiments, a single staging profile identifier definition).

Figure 2A:
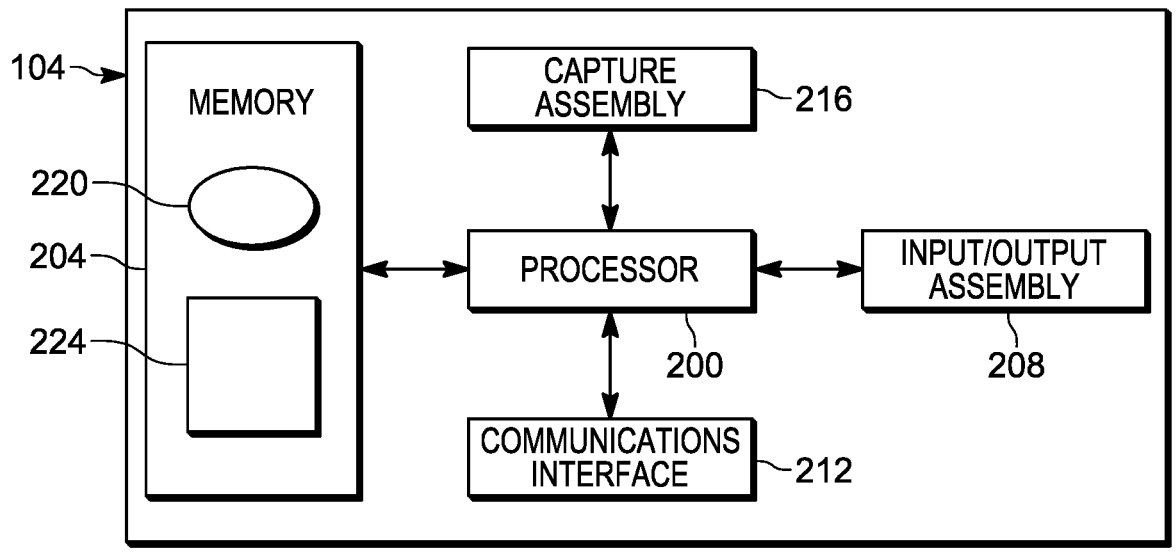
FIG. 2A is a block diagram of certain internal hardware components of a client device of FIG. 1.

Before discussing the functionality of the system 100 in greater detail, certain components of the devices 104 will be described. Turning to FIG. 2A, certain internal components of a client device 104 are illustrated. Each of the client devices 104-1 and 104-2 in the system 100 include the components shown in FIG. 2A, although the client devices 104 may have heterogeneous form factors and implementations of the components shown. Each device 104 may also include additional components not shown in FIG. 2A. For example, the device 104-1 can include a label printer assembly (not shown), while the device 104-2 does not include a label printer assembly in some embodiments.

The device 104, as illustrated in FIG. 2A, includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2A as an input/output assembly 208 interconnected with the processor 200. The input device includes any suitable one, or any suitable combination of, a touch screen, a keypad, a trigger (e.g. to initiate the performance of an encoding or scanning task), and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices, such as the server 108 via the network 112. The communications interface 212 therefore includes any suitable hardware (e.g. transmitters, receivers, network interface controllers and the like) allowing the device 104 to communicate, e.g. over the network 112.

The device 104 also includes a capture assembly 216 configured to capture the indicium 120 shown in FIG. 1 and provide the indicium 120, or data decoded from the indicium 120, to the processor 200. The capture assembly 216, in the present example in which the indicium 120 is a barcode, is a barcode scanning assembly and therefore includes one or more of a laser-based barcode scanner, a digital image sensor and the like. In other examples, the indicium 120 may be replaced with a radio frequency-based tag such as a near field communication (NFC) tag or a radio-frequency identification (RFID) tag. In such examples, the indicium 120 may be replaced by an audio signal emitted by a speaker (not shown) and encoding the staging profile identifier definition. In such embodiments, the capture assembly 216 includes a microphone.

The components of the device 104 are interconnected by communication buses (not shown), and powered by a battery or other power source, over the above-mentioned communication buses or by distinct power buses (not shown).

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a staging application 220, also referred to herein as the application 220. The device 104 is configured, via execution of the application 220 by the processor 200, to receive the staging profile identifier definition, to generate a staging profile identifier therefrom, and to request a particular one of the plurality of staging data files in the repository 116. The device 104 is further configured, upon receipt of the requested staging data file, to execute one or more instructions contained in the staging data file to complete the staging of the device 104.

The memory 204 also stores one or more local parameters 224 defining various attributes of the device 104. The local parameters 224 can include, for example, an operating system version of the device 104, a model number of the device 104, and the like. As will be discussed below, the local parameters 224 are employed via the execution of the application 220 to generate the staging profile identifier.

In other examples, the processor 200, as configured by the execution of the application 220, is implemented as one or more specifically-configured hardware elements, such as field-programmable gate arrays (FPGAs) and/or application-specific integrated circuits (ASICs).

Figure 2B:
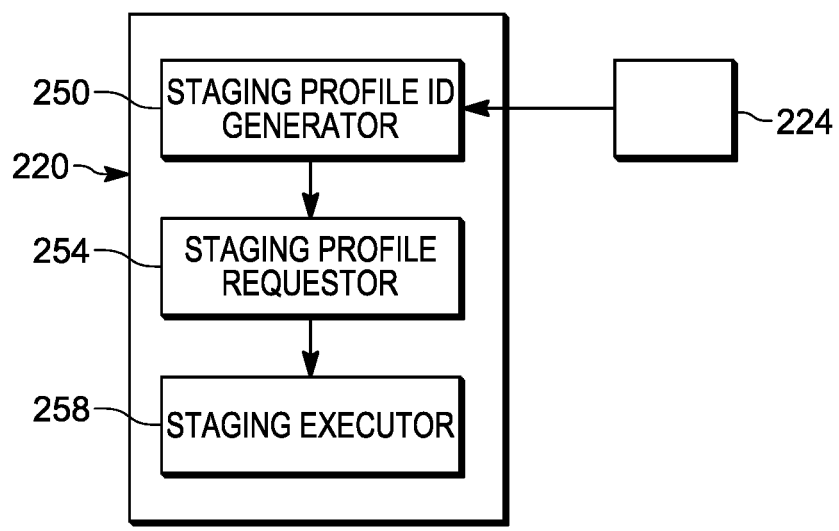
FIG. 2B is a block diagram of certain internal components of the client device of FIG. 2A.

Turning to FIG. 2B, certain components of the application 220 are illustrated. In other embodiments, the components of the application 220 may be implemented as a plurality of distinct applications executed by the processor 200. In further examples, one or more of the components of the application 220 shown in FIG. 2B can be implemented as specifically configured hardware elements, rather than as computer-readable instructions for execution by the processor 200. For example, one or more of the components shown in FIG. 2B can be implemented as an FPGA, and ASIC, or the like.

The application 220 includes a staging profile identifier generator 250, configured to generate a staging profile identifier based on the staging profile identifier definition received via capture of the indicium 120, and on the local parameters 224. The application 220 also includes a staging profile requestor, configured to generate and transmit a request to the server 108 containing the staging profile identifier generated by the generator 250. Further, the application 220 includes a staging executor 258, configured to execute the instructions contained in the staging data file received from the server 108 in response to the request sent by the requestor 254.

Figure 3:
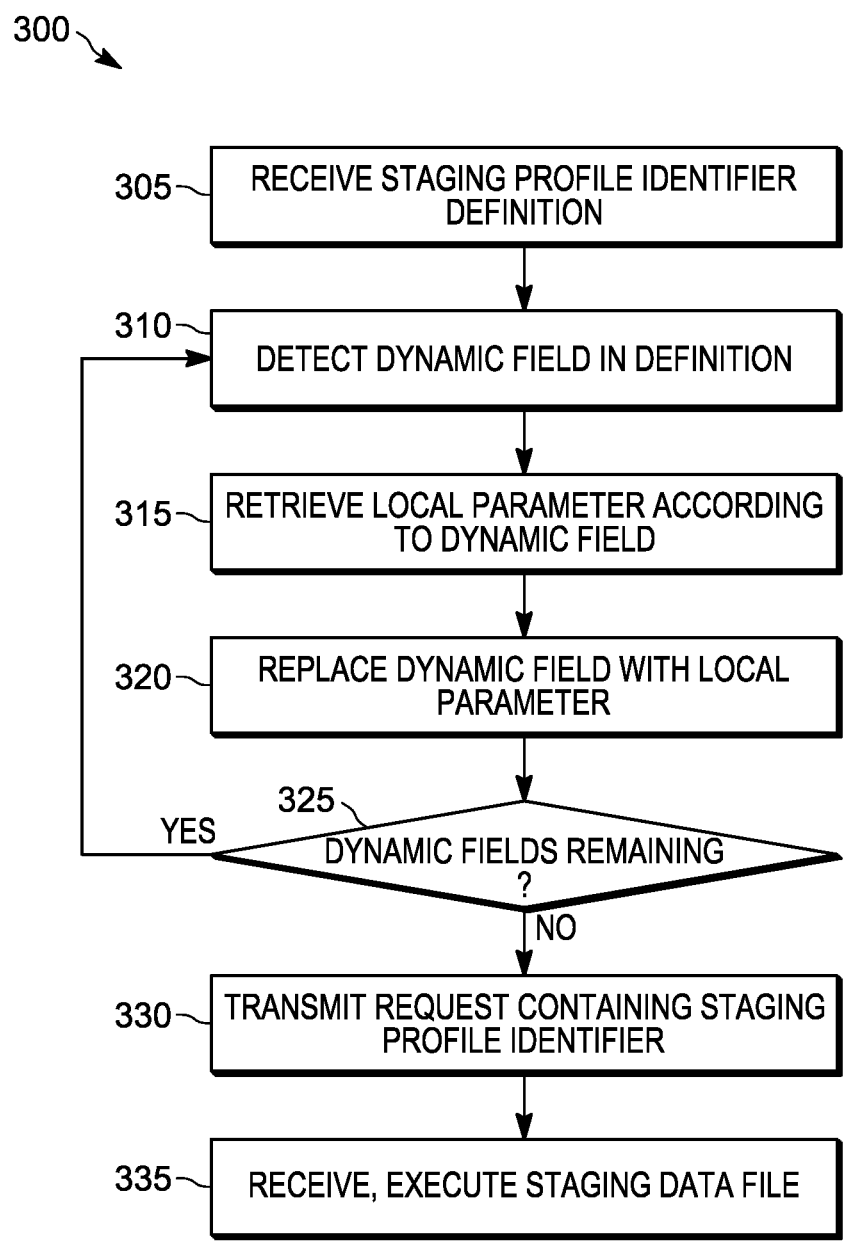
FIG. 3 is a flowchart of a method of dynamically staging the client devices of the system of FIG. 1.

Turning now to FIG. 3, a method 300 of dynamically staging client computing devices is illustrated. The method 300 will be described in conjunction with its performance on the system 100. More specifically, the method 300 as described below is performed by the devices 104 in the system 100, with reference to the components of each device 104 as illustrated in FIGS. 2A and 2B. As will be apparent in the discussion below, each device 104 may perform a separate instance of the method 300. In the example performance of the method 300 described below, the method 300 is performed by the device 104-1. An additional performance of the method 300 by the device 104-2 will then be described. The components shown in FIGS. 2A and 2B, in the discussion below, are referred to with the suffix "-1" for the device 104-1, and with the suffix "-2" for the device 104-2.

At block 305, the device 104-1, and particularly the staging profile identifier generator 250-1 of the device 104-1 is configured to receive a staging profile identifier definition. In the present example, the generator 250-1 is configured to control the capture assembly 216-1 of the device 104-1 to capture the indicium 120 and decode the indicium 120 to extract therefrom the definition. For example, the generator 250-1 can be configured to initiate the capture operation responsive to actuation of an input device (e.g. a scan trigger) of the input/output assembly 208-1 of the device 104-1.

Figure 4:
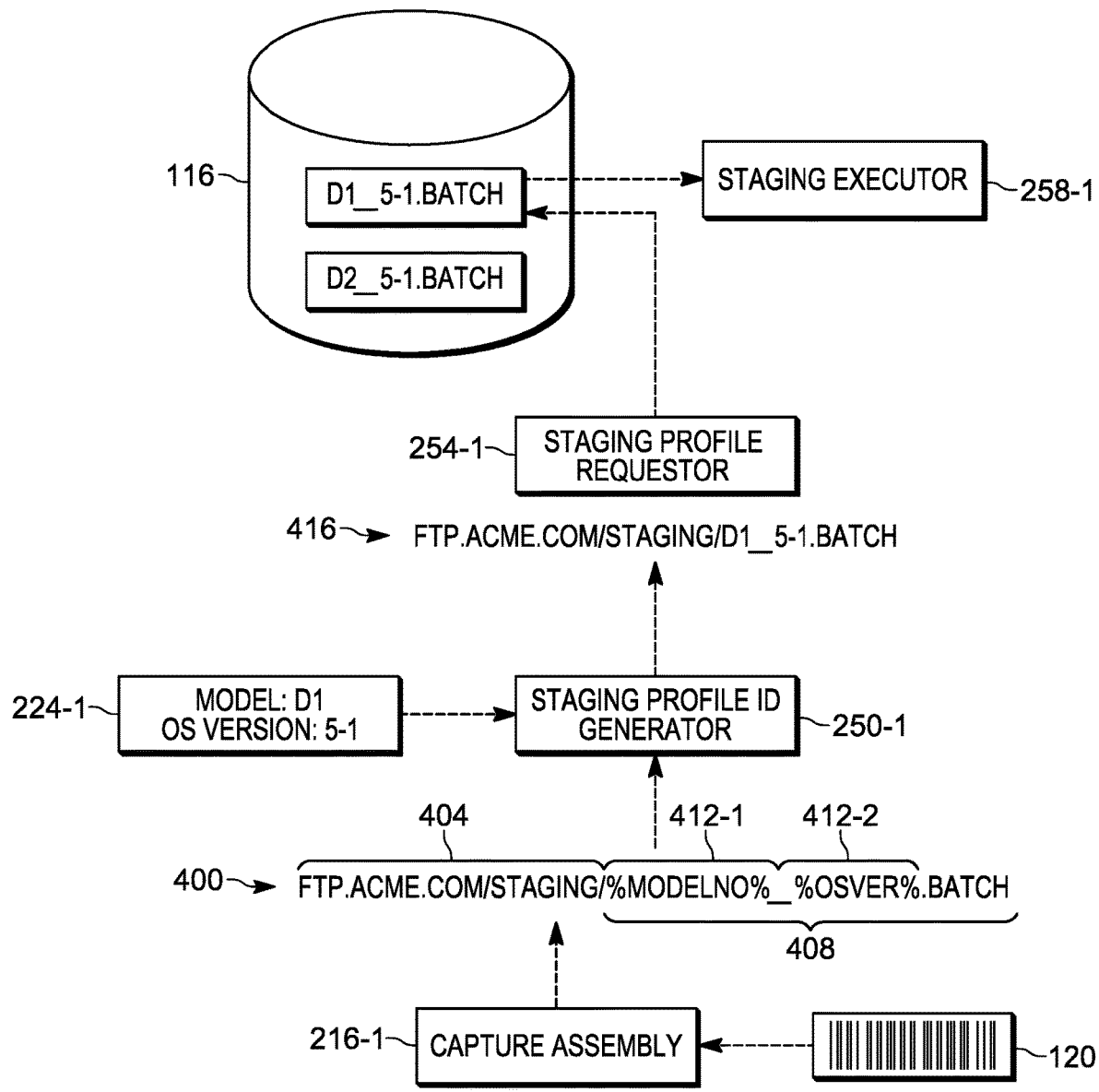
FIG. 4 illustrates a performance of the method of FIG. 3 by a first device in the system of FIG. 1.

Turning to FIG. 4, the performance of block 305 is illustrated, in which the indicium 120 is captured by the capture assembly 216-1 and a staging profile identifier definition 400 is decoded therefrom. In the present example, the definition 400 is a string. More specifically, the definition 400 is a string including a server identifier portion 404 and a filename portion 408. In the present example, the server identifier portion is static (i.e. does not include any dynamic fields), and identifies a network location of the server 108. The filename portion includes two dynamic fields 412-1 and 412-2 that, when replaced with local parameters as discussed below, permit the generation of one of a plurality of specific filenames corresponding to one of a plurality of specific staging data files at the server 108 (i.e. in the repository 116). In other examples, the server identifier portion 404 may also include dynamic fields. That is, a plurality of servers can be included in the system 100, and the server to which the device 104-1 sends a request for staging data is determined dynamically.

Returning to FIG. 3, the generator 250-1 is configured to generate a staging profile identifier from the staging profile identifier definition 400 beginning at block 310. As will be seen below, from the single staging profile identifier definition 400 received at block 305, the devices 104 can generate any of a plurality of staging profile identifiers (corresponding to specific staging data files at the server 108).

At block 310, the generator 250-1 is configured to detect a dynamic field in the staging profile identifier definition 400. The generator 250-1 is therefore, in the present example, configured to detect the dynamic field 412-1 shown in FIG. 4. The generator 250-1 may include a list of dynamic fields that can be included in the definition 400, and can traverse the definition 400 to search for portions of the definition 400 that match any dynamic fields in the list.

Having detected a dynamic field, at block 315 the generator 250-1 is configured to retrieve a local parameter according to the dynamic field. The dynamic field 412-1 corresponds to a device model number in this example, and at block 315 the generator 250-1 is therefore configured to retrieve a model number from the local parameters 224-1. At block 320, the generator 250-1 is configured to replace the dynamic field 412-1 (i.e. the field detected at block 310) with the local parameter retrieved at block 315. At block 325, the generator 250-1 is configured to determine whether any further dynamic fields remain to be processed. In the present example, the determination at block 325 is affirmative, as the field 412-2 has not yet been processed.

As will now be apparent to those skilled in the art, the generator 250-1 can be configured, at block 310, to detect all dynamic fields and select one field for processing via blocks 315 and 320. The generator 250-1 can then be configured to determine whether any dynamic fields previously detected at block 310 remain to be processed via blocks 315 and 320. In another embodiment, the generator 250-1 is configured to detect a single dynamic field at block 310, and at block 325, after the replacement of that dynamic field, to determine whether any dynamic fields remain in the modified string (i.e. after the first dynamic field has been replaced).

Returning to block 310, the generator 250-1 is configured to select the dynamic field 412-2 for further processing. The dynamic field 412-2 corresponds to an operating system version local parameter. The generator 250-1 is therefore configured, at block 315, to retrieve an operating system version from the local parameters 224-1, and to replace the dynamic field 412-2 with the retrieved operating system version at block 320.

Referring again to FIG. 4, the result of the two performances of blocks 310 to 320 are illustrated in the form of a staging profile identifier 416 generated by the generator 250-1. In particular, the server identifier portion 404 of the definition 400 remains unchanged (as it does not contain any dynamic fields in this example). However, the dynamic fields 412-1 and 412-2 have been replaced with the model number "D1" and the operating system version "5-1", respectively. The generator 250-1, in other words, generates the identifier 416 by modifying the definition 400 according to the dynamic fields 412 and the local parameters 224-1.

In the example shown in FIG. 4, the dynamic fields 412 are bounded by predefined characters, such as the percentage character "%". The generator 250 can therefore be configured to detect the dynamic fields 412 by traversing the definition 400 to detect such characters. As noted earlier, the generator 250 can be configured in some embodiments to repeatedly traverse the definition 400 to detect further dynamic fields. In such embodiments, a previously inserted local parameter may contain the predefined character (e.g. the percentage character) and therefore result in a further detection of a dynamic field. In other words, the local parameters themselves may refer to multiple additional local parameters. The generator 250 can also be configured to guard against unbounded recursion at block 325 when a local parameter contains the predefined character but does not represent a further dynamic field. In other words, the generator 250 can be configured to ignore certain of the predefined characters to prevent undesired recursion, for example by detecting not only the presence of the predefined character, but also the presence of other indications of whether or not a portion of the definition 400 is a dynamic filed (such as the presence of another predefined character within a predefined distance).

Returning to FIG. 3, at a further performance of block 325, the generator 250-1 determines that no dynamic fields remain to be processed in the definition 400. The performance of the method 300 therefore proceeds to block 330. At block 330, the requestor 254-1 is configured to generate and transmit a request to the server 108, via the communications interface. The request contains the staging profile identifier 416 generated via the performance(s) of blocks 310 to 325. In the present example, as shown in FIG. 4, the staging profile identifier 416 is a uniform resource identifier (URI) in the form of a file transfer protocol (FTP) address. Other forms are also contemplated for the request sent at block 330. For example, the requestor 254-1 can be configured to transmit the request as a message addressed to a predefined network location (e.g. stored in the application 220) and containing the staging profile identifier (e.g. a filename, without the server identifier portion shown in FIG. 4) as the body of the message.

At block 335, as also shown in FIG. 4, the executor 258-1 is configured to receive one of the plurality of staging data files in the repository 116 from the server 108. More specifically, as seen in FIG. 4, the staging profile identifier 416 includes a string "D1_5-1.batch" that matches the filename of a specific one of the staging data files stored in the repository 116. The server 108, therefore, needs only retrieve the matching staging data file and send the staging data file to the device 104-1. Accordingly, the server 108 may be implemented as a file server (e.g. an FTP server) without specialized staging host functionality.

Execution of the staging data file at block 335 includes any of a variety of actions. The staging data file, as will be understood by those skilled in the art, includes instructions executable by the device 104-1 to perform any one or more of downloading and installing additional applications, updating configuration settings (e.g. changing privacy settings, storing network connection settings, and the like).

Figure 5:
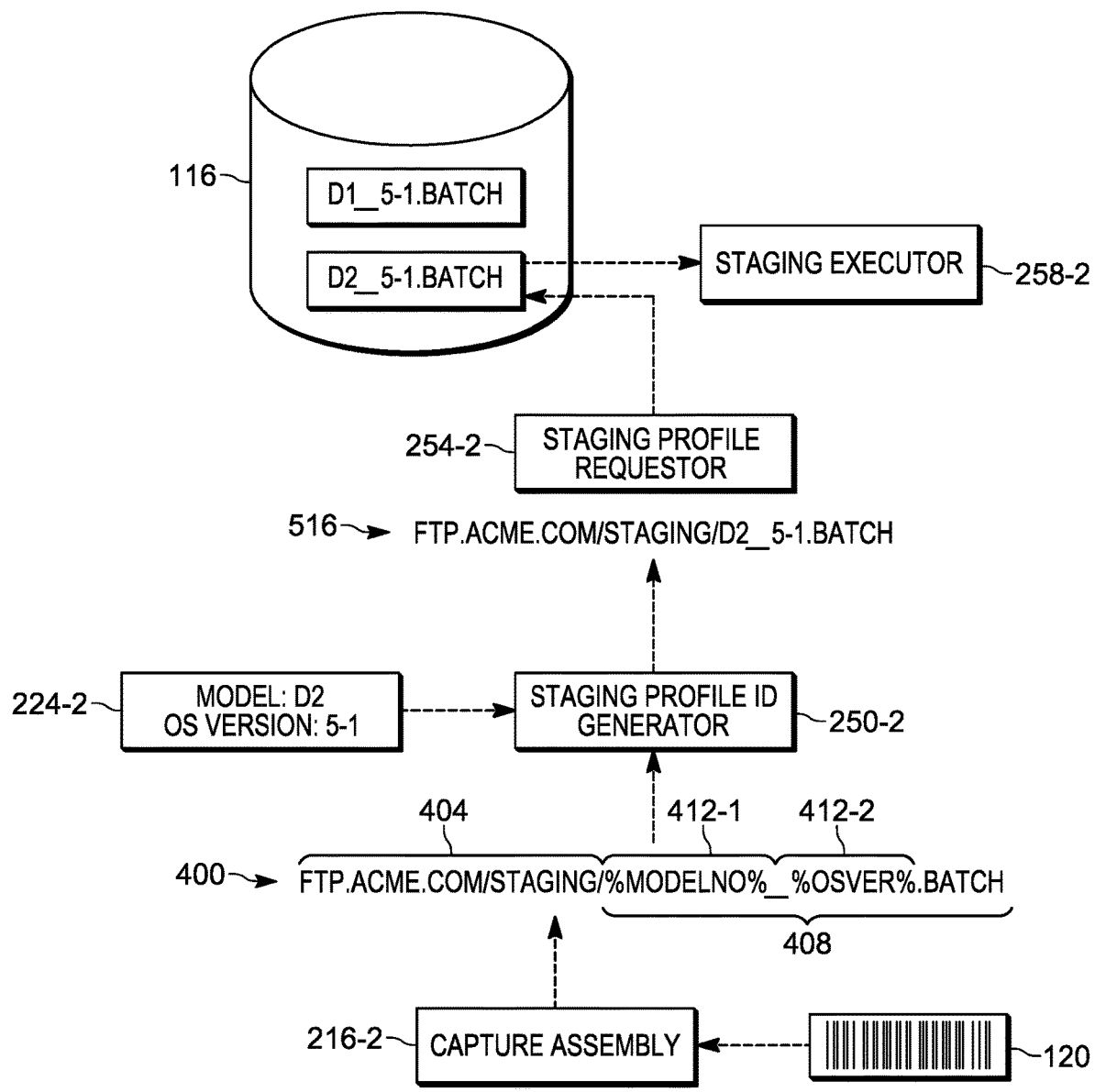
FIG. 5 illustrates a performance of the method of FIG. 3 by a second device in the system of FIG. 1.

Turning now to FIG. 5, a further performance of the method 300 is illustrated by the device 104-2. As seen in FIG. 5, at block 305 the device 104-2 captures the same indicium 120 as shown in FIG. 4, and therefore extracts therefrom the same definition 400 including the dynamic fields 412-1 and 412-2. However, via blocks 310-325, the generator 250-2 generates a staging profile identifier 516 distinct from the identifier 416 shown in FIG. 4, because the local parameters 224-2 of the device 104-2 include a different model number than local parameters 224-1 of the device 104-1. The staging profile identifier 516, therefore, includes the filename "D2_5-1.batch" rather than the filename "D1_5-1.batch" included in the staging profile identifier 416. Following the performance of block 330 by the requestor 254-2, therefore, the executor 258-2 receives a different staging data file than the executor 258-1.

Variations to the above systems and methods are contemplated. For example, the dynamic fields mentioned above corresponding to model number and operating system version can be substituted or supplemented with other suitable dynamic fields. Other dynamic fields that may be included in the staging profile identifier definition include software versions for other applications than the operating system. Further dynamic fields can corresponding to local parameters such as a location indicator (e.g. GPS coordinates, a network identifier such as an SSID that corresponds to a particular location).

In some examples, the staging profile identifier definition can include a dynamic field that refers not to a local parameter of the device 104 processing the definition, but rather to another portion of the definition itself. For example, the server identifier portion of the staging profile identifier definition may be encrypted. In such embodiments, the generator 250 is configured to decrypt the server identifier portion. The definition may repeat the server identifier portion (i.e. may include several copies of the server identifier portion), but the encrypted version of the server identifier may be too long to store multiple times in the encoding capacity provided by the indicium 120. The definition can therefore include the encrypted server identifier portion once, and for any other instances of the server identifier, a dynamic field referring to the server identifier.

The indicium, or the radio-frequency or audio signals mentioned earlier, may also include data beyond the staging profile identifier definition. For example, the indicium 120 can include, in addition to the definition 400, network configuration data identifying the network 112 (e.g. by SSID) and any credentials required to enable the devices 104 to connect to the network 112. The network configuration data itself can be dynamic, as described above in connection with the staging profile identifier definition. Thus, for example, the network configuration data can contain one or more dynamic fields permitting different device models (or devices with different software versions and the like) to connect to different networks. For example, distinct wireless networks may be deployed with identifiers (e.g. SSIDs) containing device model numbers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamic staging in a client device, comprising:
receiving and decoding, at the client device, a staging profile identifier definition including a first dynamic field containing an identifier of one of a plurality of servers and a second dynamic field containing an identifier of a local parameter including at least one of a model number of the client device or an operating system of the client device, the staging profile identifier definition corresponding to a plurality of staging profile identifiers, wherein each staging profile identifier corresponds to one of a plurality of staging data files stored at a server, after decoding the staging profile identifier definition, generating one of the plurality of staging profile identifiers corresponding to the one of the plurality of staging data files, by:

detecting the first and second dynamic fields in the staging profile identifier definition, the first dynamic filed containing the identifier of the server and the second dynamic filed containing the identifier of the local parameter;

retrieving, from a memory of the client device, a network address of the server corresponding to the first dynamic field and the local parameter corresponding to the identifier in the second dynamic field, and replacing the first dynamic field with the network address of the server and the second dynamic filed with the local parameter to generate the staging profile identifier; and retrieving the one of the plurality of staging data files by transmitting a request to the server including the staging profile identifier wherein receiving and decoding the staging profile identifier definition comprises: capturing an indicium and decoding the staging profile identifier definition from the indicium.

2. The method of claim 1, further comprising: prior to transmitting the request to the server, receiving network configuration data for establishing a connection between the client device and a network.

3. The method of claim 2, wherein receiving the network configuration data comprises: receiving the network configuration data with the staging profile identifier definition.

4. The method of claim 3, wherein the network configuration data further comprises: detecting a further dynamic field in the indicium; and generating the network configuration data based on the further dynamic field.

5. The method of claim 1, wherein receiving and decoding the staging profile identifier definition comprises: recording an audio signal and extracting the staging profile identifier definition front the audio signal.

6. The method of claim 1, wherein receiving and decoding the staging profile identifier definition comprises: receiving data from a radio-frequency tag containing the staging profile identifier definition.

7. The method of claim 1, wherein the staging profile identifier definition is a string containing the first and second dynamic fields.

8. The method of claim 7, wherein the string includes a filename portion containing the second dynamic field.

9. The method of claim 1, wherein the local parameter includes one of a software version of the client device, and a model identifier of the client device.

10. The method of claim 1, further comprising, responsive to transmitting the request: receiving the one of the plurality of staging data files; and executing the received staging data file at the client device.

11. A client computing device, comprising:
a communications interface;
a memory storing a local parameter; and
a processor interconnected with the communications interface and the memory, the processor configured to:
receive and decode a staging profile identifier definition including a first dynamic filed containing an identifier of one of a plurality of servers and a second dynamic filed containing an identifier of a local parameter including at least one of a model number of the client device or an operating system of the client device, the staging profile identifier definition corresponding to a plurality of staging profile identifiers, wherein each staging profile identifier corresponds to one of a plurality of staging data files stored at a server;

after decoding the staging profile identifier definition, generate one of the plurality of staging profile identifiers corresponding to the one of the plurality of staging data files, by:

detecting the first and second dynamic fields in the staging profile identifier definition, the first dynamic filed containing the identifier of the server and the second dynamic filed containing the identifier of the local parameter;

retrieving, from the memory, a network address of the server corresponding to the first dynamic filed and the local parameter corresponding to the identifier in the second dynamic field; and replacing the first dynamic filed with the network address of the server and the second dynamic filed with the local parameter to generate the staging profile, identifier; and retrieve the one of the plurality of staging data files by transmitting a request to the server including the staging profile identifier wherein the processor is configured to receive and decode the staging profile identifier definition by capturing an indicium and decoding the staging profile identifier definition from the indicium.

12. The client computing device of claim 11, wherein the processor is further configured to: prior to transmitting the request to the server, receive network configuration data for establishing a connection between the client device and a network.

13. The client computing device of claim 12, wherein the processor is further configured to receive the network configuration with the staging profile identifier definition.

14. The client computing device of claim 13, wherein the processor is further configured to receive the network configuration by: detecting a further dynamic field in the indicium; and generating the network configuration data based on the further dynamic field.

15. The client computing device of claim 13, wherein the processor is configured to receive and decode the staging profile identifier definition by: recording an audio signal and extracting the staging profile identifier definition from the audio signal.

16. The client computing device of claim 13, wherein the processor is configured to receive and decode the staging profile identifier definition by: receiving data from a radio-frequency tag containing the staging profile identifier definition.

17. The client computing device, of claim 13, wherein the staging profile identifier definition is a string.

18. The client computing device of claim 17, wherein the string includes a filename.

19. The client computing device of claim 11, wherein the local parameter includes one of a software version of the client device, and a model identifier of the client device.

20. The client computing device of claim 11, wherein the processor is further configured, responsive to transmitting the request, to: receive the one of the plurality of staging data files; and execute the received staging data file.

\* \* \* \* \*